(12) United States Patent
Li et al.

(10) Patent No.: US 9,374,218 B2
(45) Date of Patent: Jun. 21, 2016

(54) METHOD FOR CONDUCTING DATA ENCRYPTION AND DECRYPTION USING SYMMETRIC CRYPTOGRAPHY ALGORITHM AND TABLE LOOK-UP DEVICE

(71) Applicant: China IWNCOMM Co., LTD., Xi'an, Shaanxi (CN)

(72) Inventors: Zhiyong Li, Xi'an (CN); Jun Cao, Xi'an (CN); Xiang Yan, Xi'an (CN)

(73) Assignee: China IWNCOMM Co., LTD., Xi'an, Shaanxi (CN)

( * ) Notice: Subject to any disclaimer, the term of this patent is extended or adjusted under 35 U.S.C. 154(b) by 0 days.

(21) Appl. No.: 14/408,276

(22) PCT Filed: Jun. 9, 2013

(86) PCT No.: PCT/CN2013/077060
§ 371 (c)(1),
(2) Date: Dec. 15, 2014

(87) PCT Pub. No.: WO2013/189253
PCT Pub. Date: Dec. 27, 2013

(65) Prior Publication Data
US 2015/0172043 A1 Jun. 18, 2015

(30) Foreign Application Priority Data

Jun. 18, 2012 (CN) .......................... 2012 1 0201396

(51) Int. Cl.
*G06F 21/00* (2013.01)
*H04L 9/06* (2006.01)
(Continued)

(52) U.S. Cl.
CPC ................ *H04L 9/0631* (2013.01); *G09C 1/00* (2013.01); *H04L 9/16* (2013.01); *H04L 9/3263* (2013.01); *H04L 9/065* (2013.01); *H04L 2209/122* (2013.01)

(58) Field of Classification Search
CPC ..................................................... H04L 9/0631
See application file for complete search history.

(56) References Cited

U.S. PATENT DOCUMENTS

| | | | | |
|---|---|---|---|---|
| 2001/0038693 A1* | 11/2001 | Luyster | ................... | H04L 9/002 380/37 |
| 2003/0223580 A1* | 12/2003 | Snell | ....................... | H04L 9/003 380/28 |

(Continued)

FOREIGN PATENT DOCUMENTS

| CN | 1688121 A | 10/2005 |
|---|---|---|
| CN | 1921382 A | 2/2007 |
| CN | 102710415 A | 10/2012 |

OTHER PUBLICATIONS

Lihua et al. ("A low-cost compact AES architecture for wireless sensor network", Jun. 2010, High Technology Letters, vol. 16 No. 2, pp. 184-188.*

(Continued)

*Primary Examiner* — Morshed Mehedi
(74) *Attorney, Agent, or Firm* — Wolf, Greenfield & Sacks, P.C.

(57) ABSTRACT

Disclosed are a method for conducting data encryption and decryption using a symmetric cryptography algorithm and a table look-up device. The method comprises: when it is determined that it is required to use S-boxes to look up a table in a symmetric cryptography algorithm, determining all types of S-boxes to be used; for each type of S-box, determining the total number $N_i$ of the type of S-box, and when $N_i$ is larger than 1, determining that the type of S-box meets a multiplexing condition; and when data encryption and decryption are conducted using the symmetric cryptography algorithm, multiplexing at least one type of S-box which meets the multiplexing condition. The present application can reduce the occupation by the symmetric cryptography algorithm of hardware resources under the condition of comparative shortage of hardware resources.

13 Claims, 14 Drawing Sheets

(51) Int. Cl.
 *G09C 1/00* (2006.01)
 *H04L 9/16* (2006.01)
 *H04L 9/32* (2006.01)

(56) References Cited

U.S. PATENT DOCUMENTS

| | | | | |
|---|---|---|---|---|
| 2004/0202318 A1* | 10/2004 | Lu | ......................... | H04L 9/0631 |
| | | | | 380/29 |
| 2008/0008314 A1* | 1/2008 | Dempski | ................. | G06F 21/72 |
| | | | | 380/37 |
| 2008/0019524 A1* | 1/2008 | Kim | ...................... | H04L 9/0631 |
| | | | | 380/259 |
| 2009/0245510 A1* | 10/2009 | Ciet | ...................... | H04L 9/0625 |
| | | | | 380/29 |
| 2011/0176678 A1* | 7/2011 | Choi | ...................... | H04L 9/0631 |
| | | | | 380/259 |
| 2013/0016836 A1* | 1/2013 | Farrugia | ................ | H04L 9/0631 |
| | | | | 380/255 |

OTHER PUBLICATIONS

International Search Report dated Sep. 19, 2013 from corresponding International Application No. PCT/CN2013/077060.

Yi, Lihua, *Research on Symmetrical Cipher Algorithm in Security Mechanisms of Wireless Sensor Network,* China Doctoral Dissertations Full-Text Database Jun. 7, 2010, pp. 15-27.

Extended European Search Report dated Jun. 11, 2015 and the European Search Opinion from corresponding European Application No. 13807455.

Daemen J. et al.; Implementation Aspects, Feb. 18, 2002, The Design of Rijndael, Springer Verlag, DE, pp. 53-62, XP007913599.

* cited by examiner

METHOD FOR CONDUCTING DATA ENCRYPTION AND DECRYPTION USING SYMMETRIC CRYPTOGRAPHY ALGORITHM AND TABLE LOOK-UP DEVICE

The present application is the national phase of International Application No. PCT/CN2013/077060, filed on Jun. 9, 2013, which claims the priority to Chinese Patent Application No. 201210201396.7, entitled "Data Encryption And Decryption Method Using Symmetric Crytographic Algorithm And Table Lookup Device", filed on Jun. 18, 2012 with the State Intellectual Property Office of People's Republic of China, which applications are hereby incorporated by reference to the maximum extent allowable by law.

FIELD

The disclosure relates to the technical field of information security, in particular to a data encryption and decryption method using a symmetric cryptographic algorithm and a table lookup device.

BACKGROUND

A symmetric cryptographic algorithm uses a cryptosystem in which a same key is used for encryption and decryption, and is mainly applied to encrypt and decrypt data information. In some specific application scenarios, the symmetric cryptographic algorithm is implemented by using a hardware system. In case of limited hardware resource, reducing hardware resources occupied for implementing the symmetric cryptographic algorithm becomes a primary consideration for designing a solution of the symmetric cryptographic algorithm.

In the framework of the symmetric cryptographic algorithm, S boxes normally are necessary function components for implementing the symmetric cryptographic algorithm. The S boxes mainly implement the function of table lookup in a table with N-bit input and M-bit output. Hardware implementation for the lookup table may occupy a lot of resources, and in some symmetric cryptographic algorithms, there may be multiple S boxes that are the same.

In the field of the symmetric cryptographic algorithm, there are lots of algorithms, in which S boxes are used as function components, such as the advanced encryption standard (AES) cryptographic algorithm, the block cipher algorithm SM4 and the ZUC stream cipher algorithm. The S boxes used as function components in these algorithms are briefly described in the following.

1. AES Cryptographic Algorithm

In advanced encryption standard (AES) cryptographic algorithm, a key length may be any one of 128 bits, 192 bits or 256 bits, a packet length is fixed at 128 bits. FIG. 1 shows a flow chart of the algorithm, including an encryption process and a decryption process, which are conventional processes and are not described herein. FIG. 2 shows a key expansion process by taking the case that the key length is 128 bits as an example, which is a conventional process and is not described herein.

In the framework of the AES cryptographic algorithm, steps of using S boxes to implement table lookup operation include a byte substitution step in the encryption process, an inverse byte substitution step in the decryption process and a byte substitution step in the key expansion process. FIGS. 3*a*-3*c* are schematic diagrams of a way for using S boxes, where there are two types of S boxes, i.e., S boxes and inverse S boxes.

As shown in FIG. 3*a*, an implementation process for the byte substitution step in the encryption process includes:

1) using data to be encrypted, which has a packet length of 128 bits, as input data, and dividing the input data into 16 segments each having 8 bits;

2) selecting 16 S boxes, where each S box corresponds to one 8-bit segment, and the 16 S boxes may perform table lookup at the same time;

3) using each S box to perform table lookup for once on a corresponding 8-bit segment and to output 8-bit data based on the table lookup, and cascading the 16 pieces of 8-bit output data to form 128-bit output data; and 4) ending the byte substitution step in the encryption process.

As shown in FIG. 3*b*, an implementation process for the inverse byte substitution in the decryption process includes:

1) using data to be decrypted, which has a packet length of 128 bits, as input data, and dividing the input data into 16 segments each having 8 bits;

2) selecting 16 inverse S boxes, where each inverse S box corresponds to one 8-bit segment, and the 16 inverse S boxes may perform table lookup at the same time;

3) using each inverse S box to perform table lookup for once on a corresponding 8-bit segment and to output 8-bit data based on the table lookup, and cascading the 16 pieces of 8-bit output data to form 128-bit output data; and 4) ending the inverse byte substitution step in the decryption process.

As shown in FIG. 3*c*, an implementation process for the byte substitution step in the key expansion process includes:

1) using key data with a length of 32 bits as input data, and dividing the input data into 4 segments each having 8 bits;

2) selecting 4 S boxes, where each S box corresponds to one 8-bit segment, and the 4 S boxes may perform table lookup at the same time;

3) using each S box to perform table lookup for once on a corresponding 8-bit segment and to output 8-bit data based on the table lookup, and cascading the 4 pieces of 8-bit output data to form 32-bit output data; and 4) ending the byte substitution step in the key expansion process.

It may be seen from the foregoing description that 20 S boxes and 16 inverse S boxes are needed to implement the AES cryptographic algorithm.

2. SM4 Cryptographic Algorithm

In the SM4 cryptographic algorithm, a key length and a packet length are both fixed at 128 bits. FIG. 4 shows an encryption process in the SM4 cryptographic algorithm, FIG. 5 shows a decryption process in the SM4 cryptographic algorithm and FIG. 6 shows a key expansion process in the SM4 cryptographic algorithm. The specific processes of encryption, decryption and key expansion are conventional processes, and are not described herein.

In the framework of the SM4 cryptographic algorithm, steps of using S boxes to implement table lookup operation include a byte substitution step in the encryption process, a byte substitution step in the decryption process and a byte substitution step in the key expansion process. FIG. 7 shows a way for using the S boxes, where there is only one type of S boxes, i.e., S boxes used to perform encryption, decryption and key expansion have a same type, and same S boxes are used to perform both the encryption and the decryption.

As shown in FIG. 7, an implementation process for the byte substitution steps in the encryption process, decryption process and key expansion process of the SM4 cryptographic algorithm includes:

1) using data with a length of 32 bits as input data, and dividing the input data into 4 segments each have 8 bits;

2) selecting 4 S boxes, where each S box corresponds to one 8-bit segment, and the boxes may perform table lookup at the same time;

3) using each S box to perform table lookup for once on corresponding 8-bit segment and to output 8-bit data based on the table lookup, and cascading the 4 pieces of 8-bit output data to form 32-bit output data; and 4) ending the byte substitution step.

It may be seen from the foregoing description that if S boxes are not reused, 8 S boxes are needed to complete the SM4 cryptographic algorithm.

3. ZUC Cryptographic Algorithm

The ZUC algorithm is a word-oriented stream cipher algorithm, in which the input is a 128-bit key Key and a 128-bit initial vector IV, and 32-bit key words are continually output according to the length requirement of the key. FIG. 8 shows the framework of the ZUE algorithm, and the specific algorithm process is a conventional process and is not described herein. In the algorithm framework, steps in which S boxes are used to perform table lookup include steps for evaluating R1 and R2 in a nonlinear function F.

FIG. 9 is a schematic diagram of a way for using S boxes, where there are two types of S boxes, i.e., S0 boxes and S1 boxes.

As shown in FIG. 9, in the ZUC algorithm, during evaluating R1 and R2 in the nonlinear function F, the process of implementing table lookup using S boxes includes:

1) using data with a length of 32 bits as input data, and dividing the input data into 4 segments each having 8 bits;

2) selecting 4 S boxes, including two S0 boxes and two S1 boxes, where the S0 boxes correspond to the first and the third segments of the four segments, S1 boxes correspond to the second and fourth segments of the four segments, each S box corresponds to one 8-bit segment, and 4 S boxes may perform table lookup at the same time.

3) using each S box to perform table lookup for once on corresponding 8-bit segment and to output 8-bit data based on the table lookup, and cascading the 4 pieces of 8-bit output data to form 32-bit output data; and 4) ending the table lookup process performed by using the S boxes.

It may be seen from the foregoing description that if the S boxes are not reused, 2 S0 boxes and 2 S1 boxes are needed to complete the ZUC cryptographic algorithm.

In the AEC cryptographic algorithm, the SM4 cryptographic algorithm and the ZUC cryptographic algorithm, all components implementing encryption function form an encryption unit, all components implementing decryption function form a decryption unit, all components configured to generate keys form a key expansion unit, and units for completing S box table lookup function, which are similar to those shown in FIG. 3a, FIG. 3b, FIG. 3c, FIG. 7 and FIG. 9, are called table lookup units.

It is can be known from implementation principles for encryption and decryption in the AES cryptographic algorithm, the SM4 cryptographic algorithm and the ZUC cryptographic algorithm, a large number of S boxes may be used in the encryption and decryption processes for the various algorithms, therefore in a case hardware is used to implement encryption and decryption, the S boxes may occupy a lot of hardware resources, which is unsatisfactory in case of limited resources.

SUMMARY

A data encryption and decryption method using a symmetric cryptographic algorithm and a table look-up device are provided according to the disclosure, to reduce hardware resource occupied for implementing the symmetric cryptographic algorithm in case of limited resources.

A data encryption and decryption method using a symmetric encryption algorithm is provided according to the disclosure. The method includes:

once it is determined that S boxes are needed to be used to perform table lookup in the symmetric cryptographic algorithm, determining types of all S boxes needed to be used;

for each type of S boxes, determining a total number $N_i$ of S boxes of the type, and in a case that $N_i$ is greater than 1, determining that a reusing condition is satisfied for this type of S boxes; and reusing at least one type of S boxes, for which the reusing condition is satisfied, in the data encryption and decryption using the symmetric cryptographic algorithm.

A table look-up device for data encryption and decryption using the symmetric cryptographic algorithm is also provided according to the disclosure. The device includes:

a processing unit for table lookup input data, configured to when table lookup is needed in the encryption and decryption using the symmetric cryptographic algorithm, process input data for which the table lookup needs to be performed, for feeding into a S box reusing unit;

the S box reusing unit, configured to reuse types of S boxes which satisfy a reusing condition and are selected to be reused, perform table lookup with the table lookup input data according to a predetermined correspondence relationship, and for each type of S boxes, in a case that a total number $N_i$ of S boxes of this type is greater than 1, determine that S boxes of this type satisfy the reusing condition; and a processing unit for table lookup output data, configured to process table lookup output information from the S box reusing unit to acquire a table lookup result.

The data encryption and decryption method using the symmetric cryptographic algorithm and the table look-up device provided according to the disclosure are advantageous as follows. Number of S boxes may be determined through using reusing S boxes according to requirement on hardware resource occupation, so that hardware resource occupation may be effectively adjusted, to reach requirement on the scope of applying the algorithm.

DETAILED DESCRIPTION

A data encryption and decryption method using a symmetric cryptographic algorithm, which is provided according to the disclosure, is described in detail in conjunction with drawings and embodiments in the following.

Figure 1:
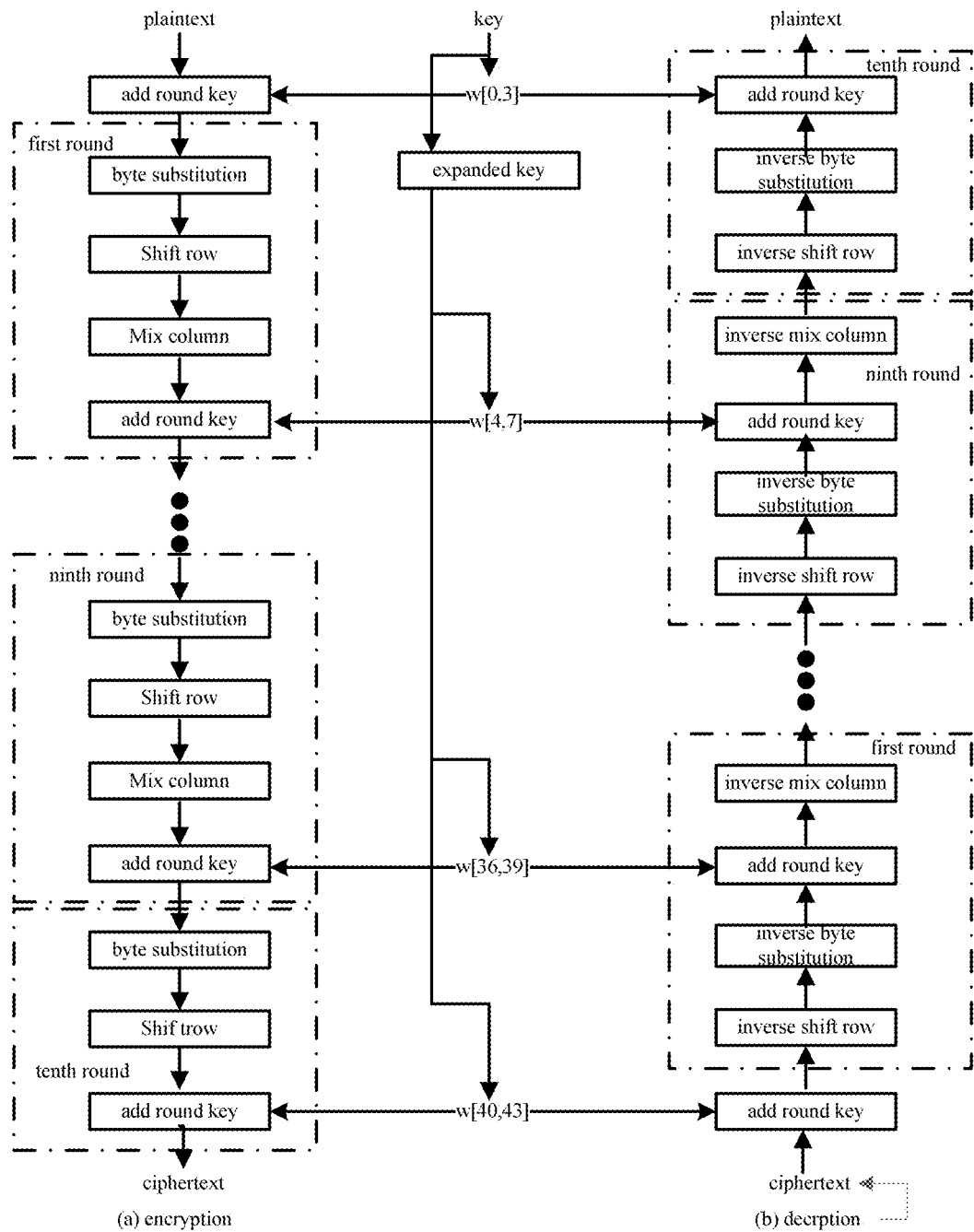
FIG. 1 is a schematic flow chart of encryption and decryption in the AES algorithm.
Figure 2:
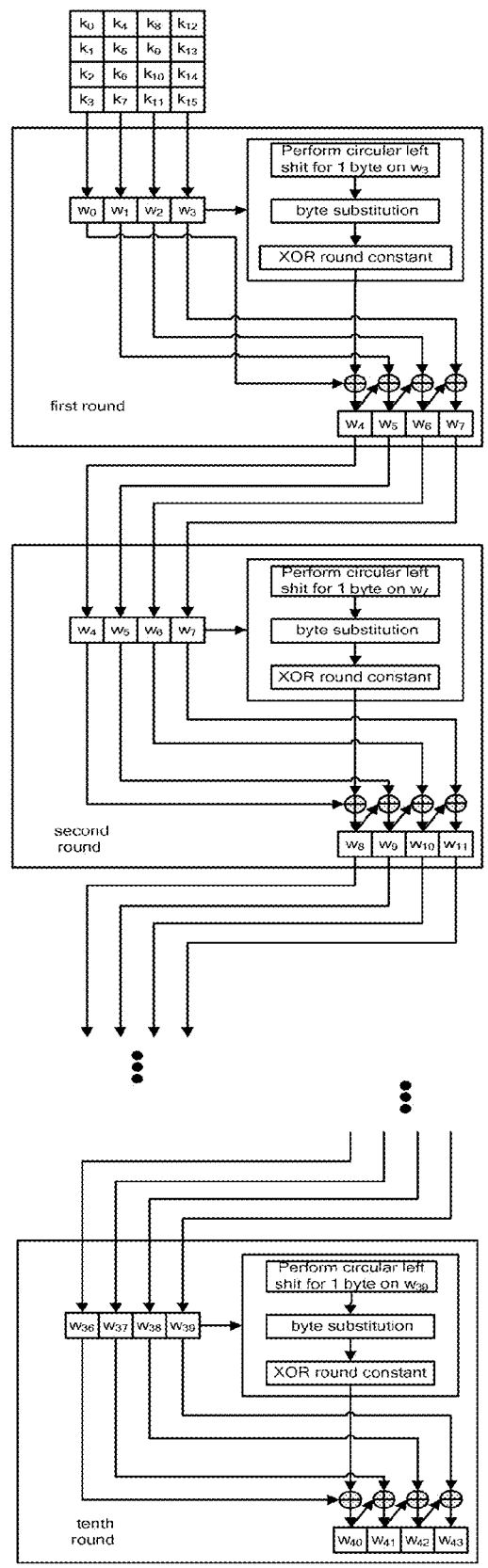
FIG. 2 is a schematic flow chart of key expansion in the AES algorithm.
Figure 3A:
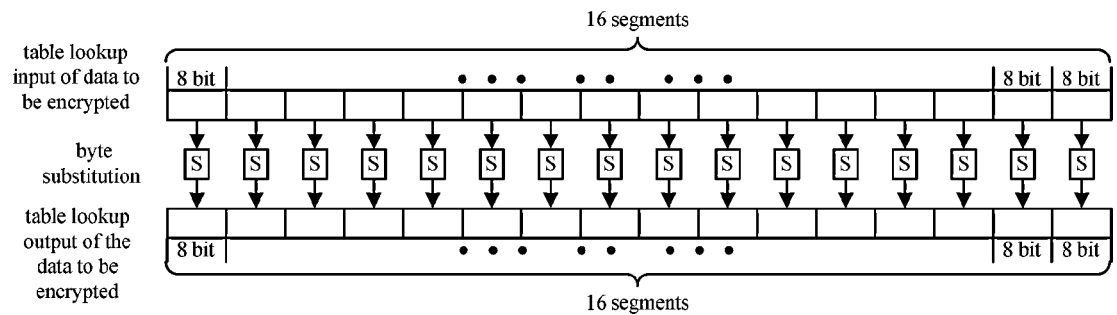
FIG. 3a is a schematic diagram of using S boxes in a byte substitution step of an encryption process in the AES algorithm.
Figure 3B:
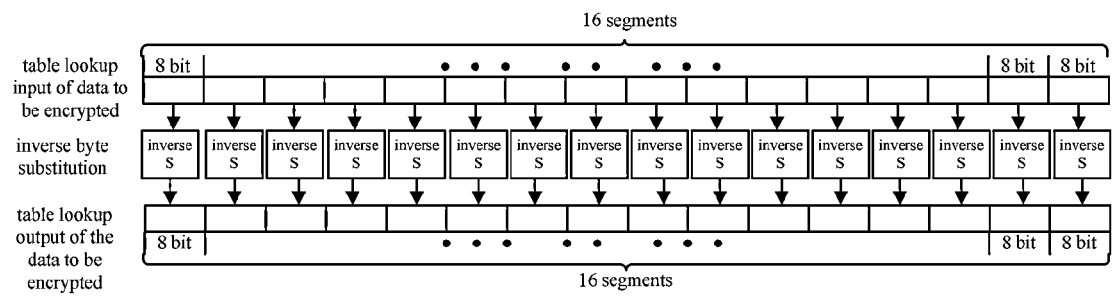
FIG. 3b is a schematic diagram of using S boxes in an inverse byte substitution step of an decryption process in the AES algorithm.
Figure 3C:
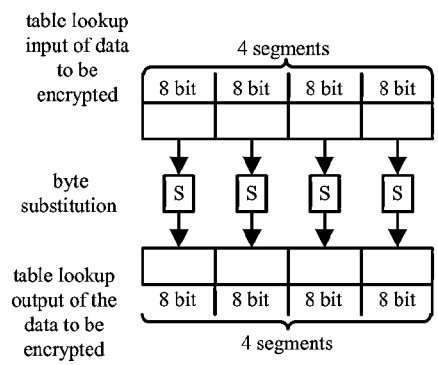
FIG. 3c is a schematic diagram of using S boxes in byte substitution operation of a key expansion process in the AES algorithm.
Figure 4:
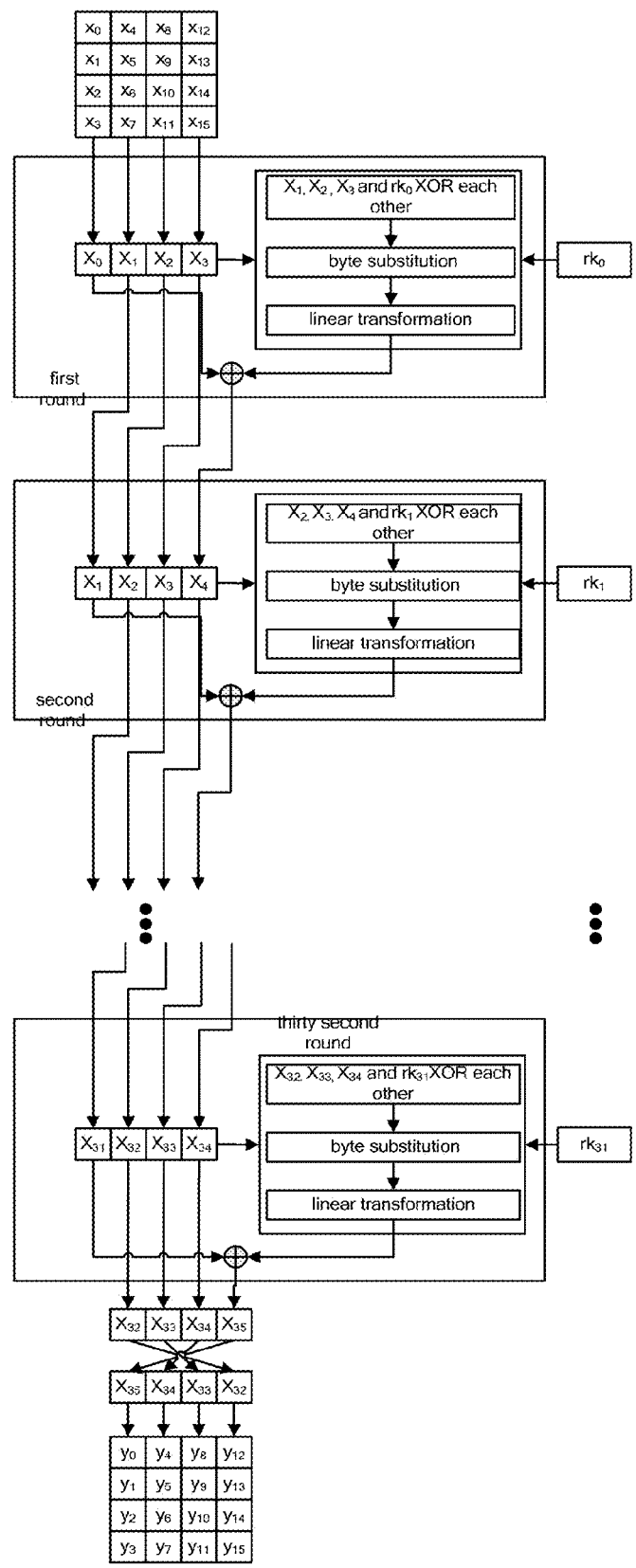
FIG. 4 is a schematic diagram of an encryption process in the SM4 algorithm.
Figure 5:
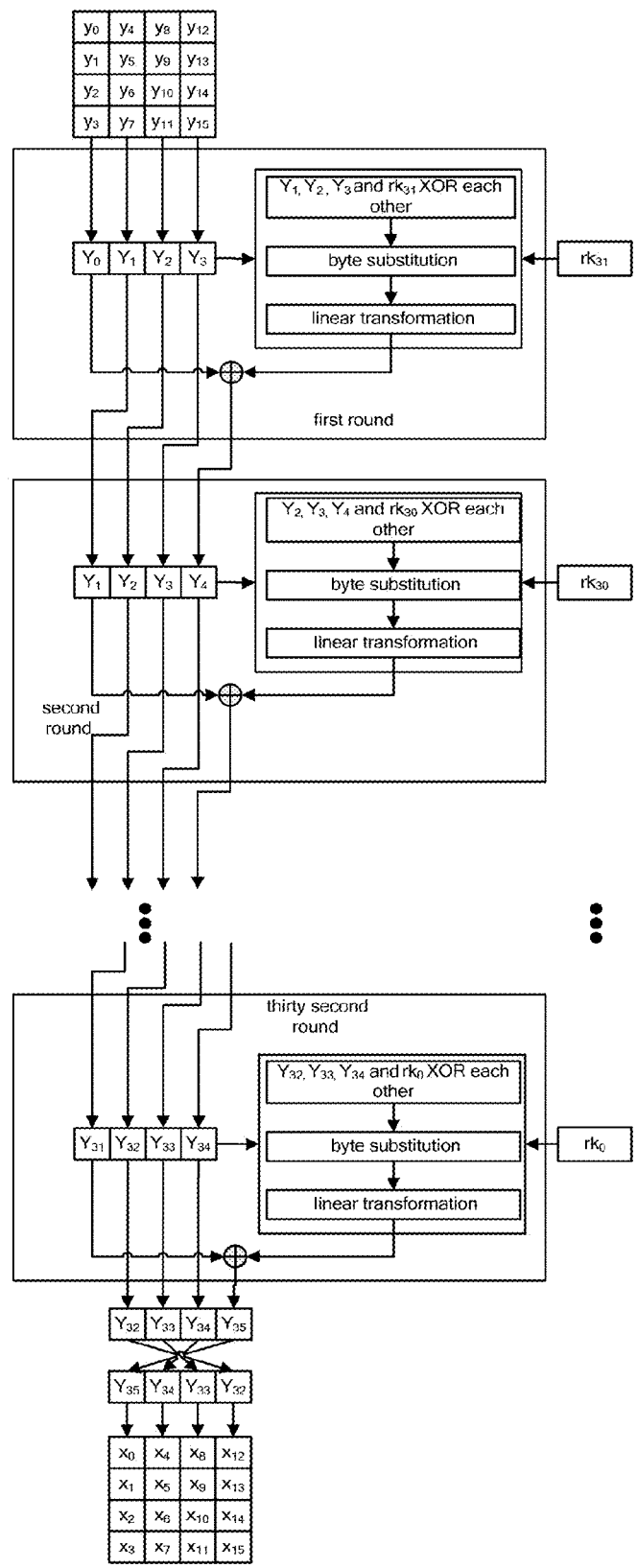
FIG. 5 is a schematic diagram of a decryption process in the SM4 algorithm.
Figure 6:
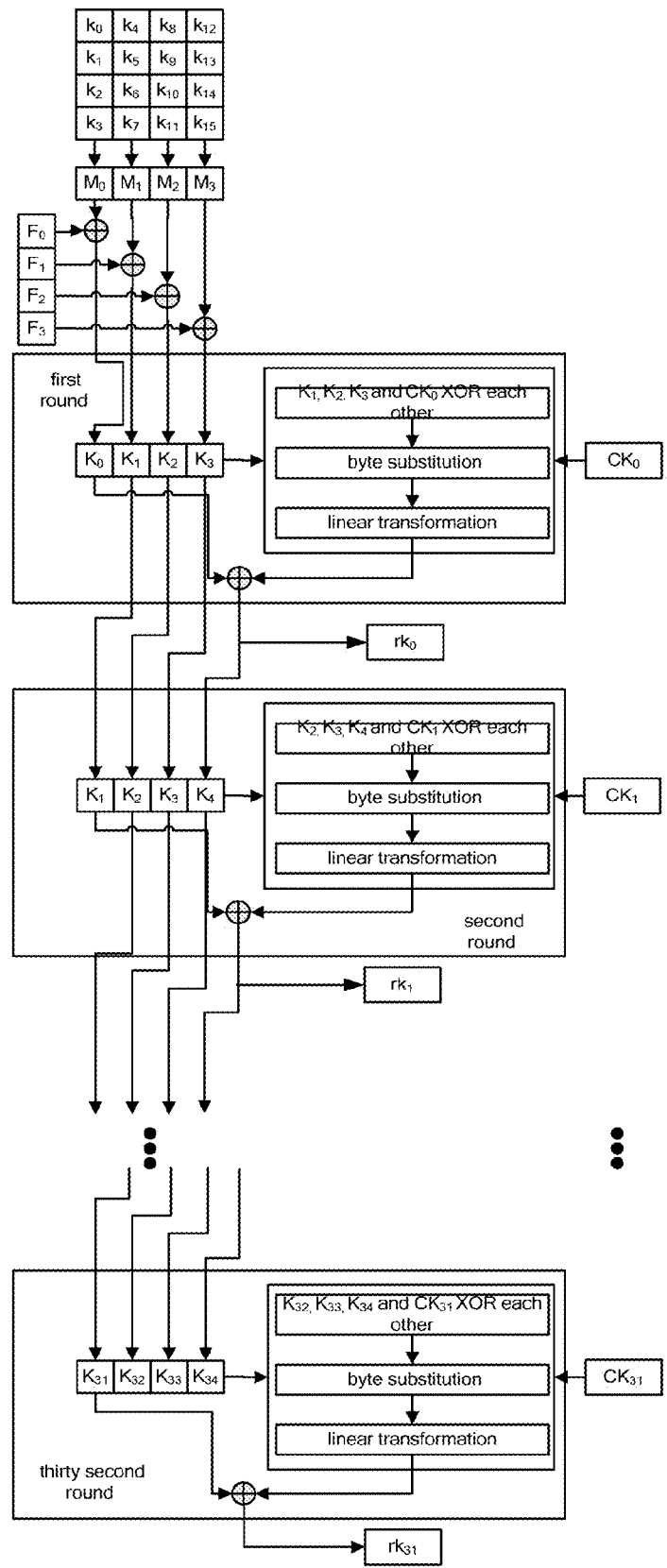
FIG. 6 is a schematic flow chart of a key expansion process in the SM4 algorithm.
Figure 7:
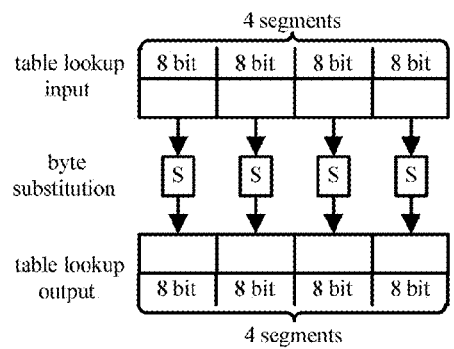
FIG. 7 is a schematic diagram of a way for using S boxes in the SM4 algorithm.
Figure 8:
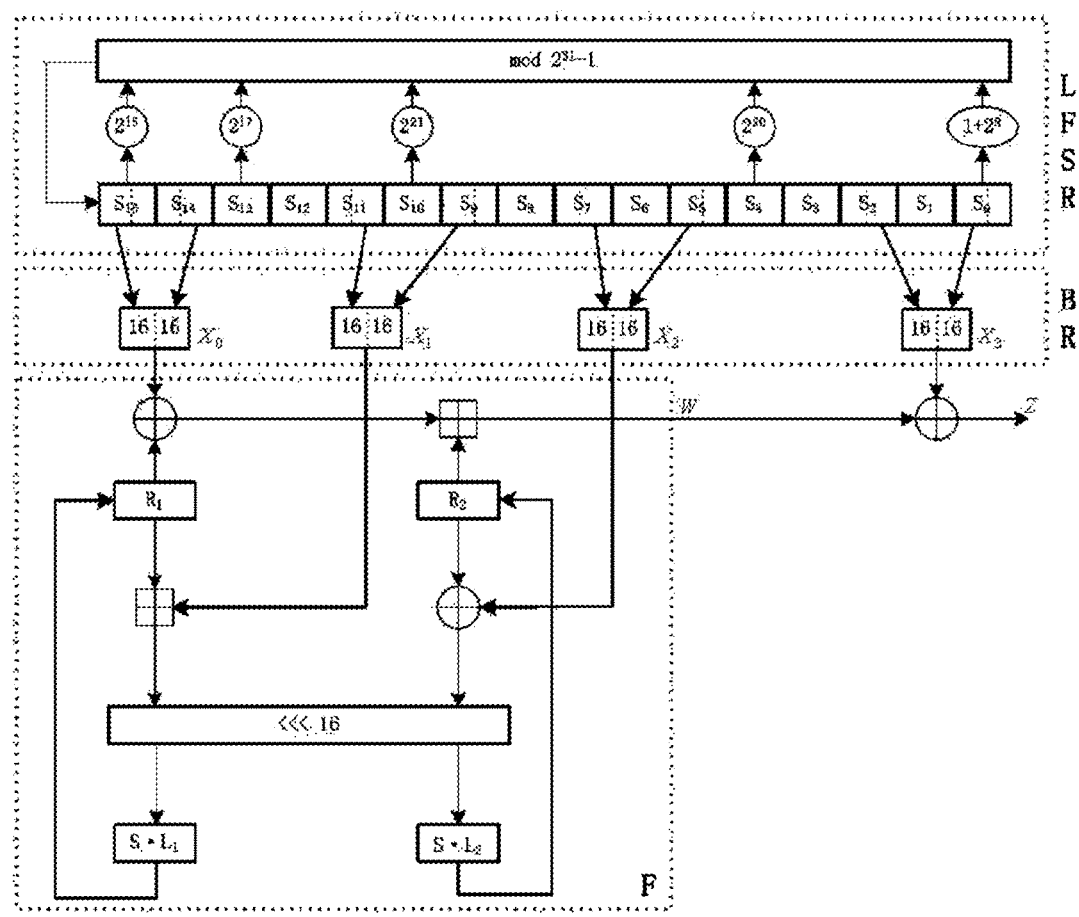
FIG. 8 is a schematic diagram of a framework of the ZUC stream cipher algorithm.
Figure 9:
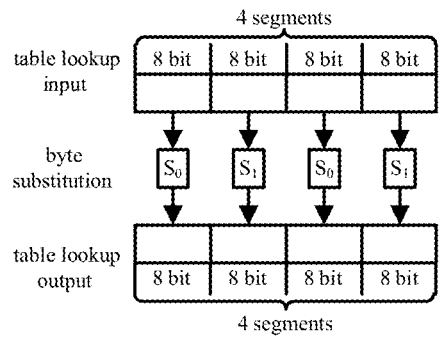
FIG. 9 is a schematic diagram of a way for using S boxes in the ZUC stream cipher algorithm.
Figure 10:
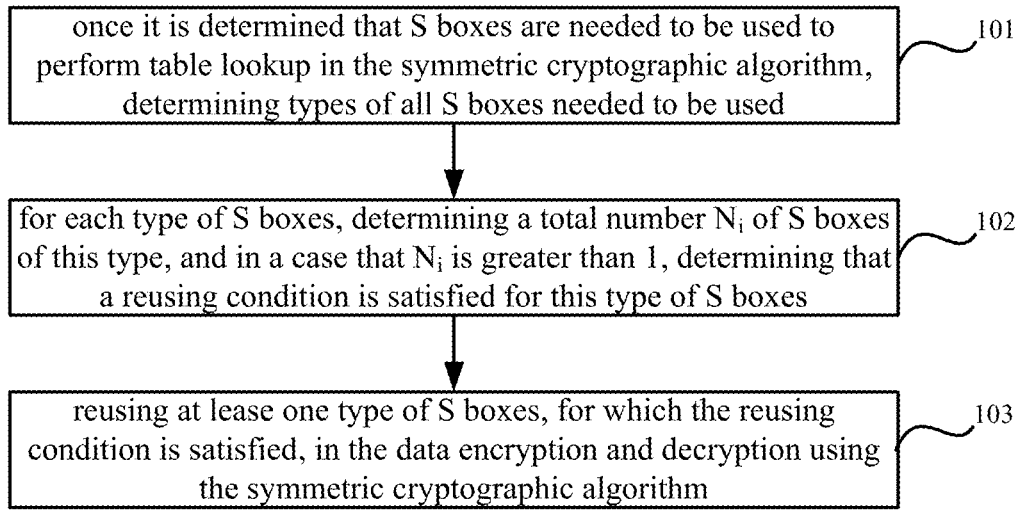
FIG. 10 is a flow chart of a data encryption and decryption method using a symmetric cryptographic algorithm according to an embodiment of the disclosure.

As shown in FIG. 10, a data encryption and decryption method using symmetric encryption algorithm is provided according to the disclosure. The method includes following steps.

Step 101 includes: once it is determined that S boxes are needed to be used to perform table lookup in the symmetric cryptographic algorithm, determining types of all S boxes needed to be used.

Specifically, according to a standard process of the symmetric cryptographic algorithm, whether the S boxes are needed to be used as algorithm components may be determined, if the S boxes are needed to be used as the algorithm components, according to the standard process of the symmetric encryption algorithm, types of all needed S boxes, i.e., kinds of the S boxes and the number of S boxes for each kind, may also be determined. In this embodiment, it is assumed that M types of S boxes are needed.

Step 102 includes: for each type of S boxes, determining a total number $N_i$ of S boxes of this type, and in a case that $N_i$ is greater than 1, determining that a reusing condition is satisfied for this type of S boxes.

Specifically, it is assumed that in the standard process of the symmetric encryption algorithm, there are $N_i$ S boxes for each of the M types, where i is a serial number and is in a range of 1 to M.

For any one of the M types of S boxes, whether the number $N_i$ of the S boxes is greater than 1 is determined, if $N_i$ is greater than 1, it is determined that the reusing condition is satisfied for this type of S boxes, so that the S boxes may be reused; and if $N_i$ is smaller than or equal to 1, the S boxes may not be reused.

Step 103 includes: reusing at least one type of S boxes, for which the reusing condition is satisfied, in the data encryption and decryption using the symmetric cryptographic algorithm.

According to the embodiment, for the at least one type of S boxes satisfying the reusing condition, the reusing is in the way of reducing the number of S boxes of this type as compared to that specified in the standard process of the symmetric cryptographic algorithm, i.e., if total number of S boxes of this type is $N_i$ before reuse, after reuse the total number of S boxes of this type is greater than or equal to 1 and is smaller than $N_i$.

According to the embodiment, through reusing S boxes, the number of S boxes may be determined according to requirement on hardware resource occupation, so that hardware resource occupation may be effectively adjusted, to reach requirement on the scope of applying the algorithm.

Preferably, in a case that the reusing condition is not satisfied for a type of S boxes, i.e., there is only one S box of this type, the S box is used as one table lookup unit, and an algorithm subunit using this type of S boxes uses the table lookup unit to perform table lookup.

According to the embodiment of the disclosure, S boxes of all types satisfying the reusing condition may be reused, or S boxes of some of the types satisfying the reusing condition may be reused selectively. If S boxes of some of the types satisfying the reusing condition may be reused selectively, for each of those types of S boxes which satisfy the reusing condition and are not reused, an existing mechanism may be used to perform table lookup, i.e., all algorithm subunits using the type of S boxes and S boxes of this type used by each algorithm subunit are determined, the S boxes of this type used by each algorithm subunit are used as one table lookup unit, and the algorithm subunit uses its corresponding table lookup unit to perform table lookup.

According to the preferred embodiment of the disclosure, once it is determined to reuse one type of S boxes satisfying the reusing condition, a preferred reusing way includes:

determining algorithm subunit(s) using the type of S boxes;

in a case that there is only one algorithm subunit using the type of S boxes, determining that after reuse, the number of S boxes of this type is u where $1 \leq u < N_i$, i.e., reducing the number of S boxes of this type used by the algorithm subunit;

using u S boxes of this type as one table lookup unit, where the algorithm subunit uses the table lookup unit to perform table lookup.

According to another preferred embodiment of the disclosure, once it is determined to reuse one type of S boxes satisfying the reusing condition, a preferred reusing way includes:

determining algorithm subunit(s) using the type of S boxes;

in a case that there are at least two algorithm subunits using the type of S boxes, for at least two among the algorithm subunits using the type of S boxes, determining that after reuse, the number of S boxes of this type used by the at least two algorithm subunits is u, where $1 \leq u \leq N_{max}$, and $N_{max}$ represents the maximum number of S boxes of this type used by one of the at least two algorithm subunits which uses most S boxes before reuse; and using u S boxes of this type as one table lookup unit, and performing table lookup through using the table lookup unit in time sharing mode by the at least two of the algorithm subunits using the type of S boxes.

According to the embodiment, one table lookup is reused by multiple algorithm subunits, therefore the multiple algorithm subunits reusing the table lookup unit may not use the table lookup unit to perform table lookup at the same time, and need to use the table lookup unit to perform table lookup in time sharing mode.

According to another embodiment of the disclosure, once it is determined to reuse one type of S boxes satisfying the reusing condition, a preferred reusing way includes:

determining algorithm subunit(s) using the type of S boxes; and in a case that there are at least two algorithm subunits using the type of S boxes, for each one of at least one algorithm subunit among the algorithm subunits using the type of S boxes, determining that after reuse, the number of S boxes of this type used by the algorithm subunit is $u_i$, where $1 \leq u_i < N_j$, and $N_j$ represents the number of S boxes of this type used by the algorithm subunit before reuse; using $u_i$ S boxes of this type as one table lookup unit, and performing table lookup using the table lookup unit independently by the algorithm subunit.

Specially, for the type of S boxes, the number of S boxes used by each algorithm subunit using the type of S boxes may be reduced. Alternatively, the number of S boxes used by some of the algorithm subunits using the type of S boxes may be reduced, and for those algorithm subunits for which the number of S boxes of this type is not reduced, S boxes of this type used by the algorithm subunit are determined and the determined boxes are used as one table lookup unit to be used by the algorithm subunit to perform table lookup.

According to the embodiment, each algorithm subunit uses a corresponding table lookup unit to perform table lookup independently, therefore it is possible for multiple algorithm subunits to perform table lookup at the same time.

According to another preferred embodiment of the disclosure, once it is determined to reuse one type of S boxes satisfying the reusing condition, a preferred reusing way includes:

determining algorithm subunit(s) using the type of S boxes;

in a case that there are at least three algorithm subunits using the type of S boxes, for each one of at least one algorithm subunit among the algorithm subunits using the type of S boxes, determining that after reuse, the number of S boxes of this type used by the algorithm subunit is $u_i$, where $1 \leq u_i < N_j$, and $N_j$ is the number of S boxes of this type used by the algorithm subunit before reuse; using $u_i$ S boxes of this type as one table lookup unit, and performing table lookup using the table lookup unit independently by the algorithm subunit; and for at least two among the algorithm subunits using the type of S boxes, determining that after reuse, the number of S boxes of this type used by the at least two algorithm subunits is $u_{com}$, where $1 \leq u_{com} \leq N_{max}$, and $N_{max}$ represents the maximum number of S boxes of this type used by one of the at least two algorithm subunits which uses most S boxes before reuse; using $u_{com}$ S boxes of this type as one table lookup unit, and performing table lookup through using the table lookup unit in time sharing mode by the at least two of the algorithm subunits using the type of S boxes.

According to the embodiment, specifically, if some S boxes of this type used by algorithm subunits are not reused, for each algorithm subunit which does not reuse the type of S boxes, S boxes of this type used by the algorithm subunit are determined, the S boxes of this type used by the algorithm subunit are used as one table lookup unit, and the algorithm subunit uses its corresponding table lookup unit to perform table lookup.

Preferably, the symmetric cryptographic algorithm is the AES algorithm, the block cipher SM4 algorithm or the ZUC stream cipher algorithm.

Preferably, the algorithm subunit is an encryption unit, a decryption unit or a key expansion unit. In implementation for a specific cryptographic algorithm (such as the SM4 cryptographic algorithm), the encryption unit and the decryption unit are sometimes implemented in a same logic unit, and in this case, it should be regarded that there is one algorithm subunit.

Preferably, according to the embodiment of the disclosure, for any algorithm subunit, once it is determined that S boxes used by the algorithm subunit are reused selectively, a table lookup unit corresponding to the algorithm subunit is determined according to reuse situation of the S boxes, and the algorithm subunit uses the corresponding table lookup unit to perform table lookup, which includes:

determining a maximum length h of input data of the table lookup unit according to the number of S boxes for the table lookup unit and a length of input data of each S box;

dividing the input data for table lookup performed by the algorithm subunit through using the table lookup unit into k data segments according to a total length l of the input data, where $k = \lceil l/h \rceil$, $\lceil \ \rceil$ represents rounding up;

executing table lookup operation for k times in a way of, for each time performing the table lookup operation, dividing an input data segment into data units based on the length of input data of the S box, feeding each data unit into the corresponding S box according to a predetermined correspondence relationship to perform the table lookup, and determining output information of the table lookup operation according to the predetermined relationship; and cascading the output information of the k executions of the table lookup to acquire a table lookup result.

A preferred embodiment of the data encryption and decryption method using the symmetric cryptographic algorithm is described according to a specific example in the following.

In a case that there is only one type of S boxes, and there is only one algorithm subunit using the S boxes of this type, based on the ways for reusing S boxes provided according to the disclosure, the S boxes are reused in one way, i.e., the way in which one algorithm subunit uses one table lookup unit, as described in a first embodiment.

First Embodiment

Figure 11:
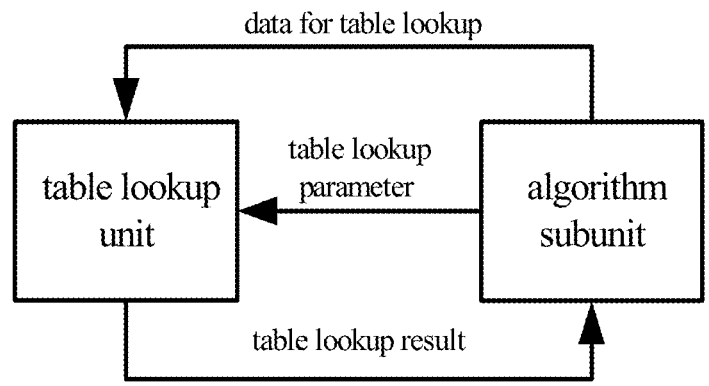
FIG. 11 is a schematic diagram of a way for using S boxes according to a first embodiment of the disclosure.

In this embodiment, as shown in FIG. 11, one algorithm subunit uses one table lookup unit. Taking a case that a standard symmetric cryptographic algorithm needs to use 4 S boxes each with 6-bit input and 4-bit output as an example, a total length of input data of the algorithm subunit is assumed to be 48 bits and the application way includes:

(1) determining that S boxes are components in the symmetric cryptographic algorithm, and determining that there is one type of S boxes and the number of the S boxes is 4;

(2) determining that it is possible to reuse the S boxes since the number of the S boxes is greater than 1;

(3) determining to reuse the S boxes, and determining to use 3 S boxes, so that a maximum length of input data of the table lookup unit is 18 bits;

(4) dividing the input data of the table lookup unit into 3 data units each having 6 bits, determining that the first data unit corresponds to the third S box, the second data unit corresponds to the second S box, and the third data unit corresponds to the first S box;

(5) if a total length of input data of the algorithm subunit is 48 bits, dividing the 48 bits into 3 input data segments, where a length of the first data segment is 18 bits, a length of the second data segment is 18 bits, and a length of the third data segment is 12 bits;

(6) determining that a table lookup parameter is 3, performing table lookup operation for 3 times according to the table lookup parameter, and determining a table lookup output according to a correspondence relationship between the data input and the S boxes which is determined in step (4); and (7) cascading the table lookup outputs to form a final output of the table lookup.

In a case that there is only one type of S boxes in the symmetric cryptographic algorithm and there are two or more algorithm subunits using the S boxes, according to the ways for reusing S boxes provided according to the disclosure, there are three ways for reusing S boxes, the first way is that the two or more algorithm subunits share a common table lookup unit, the second way is that each of the two or more algorithm subunits uses one table lookup unit independently, the third way is that two and more algorithm subunits share a common table lookup unit and at least one algorithm subunit uses one table lookup unit independently.

Second Embodiment

Figure 12:
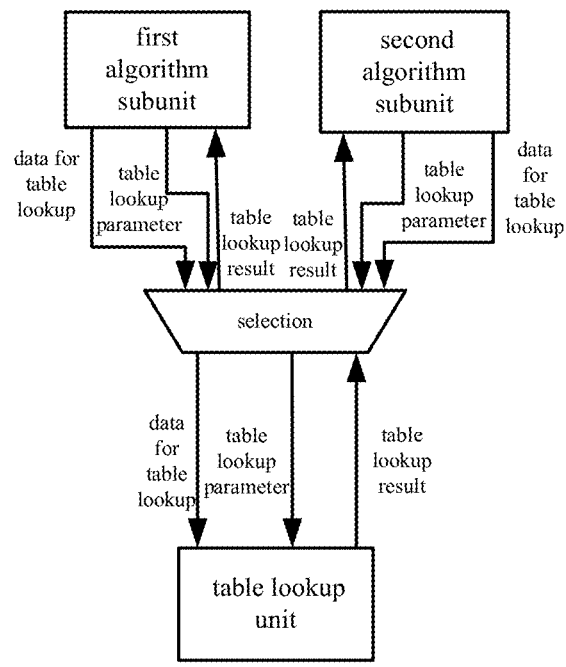
FIG. 12 is a schematic diagram of a way for using S boxes according to a second embodiment of the disclosure.

In this embodiment, as shown in FIG. 12, two or more algorithm subunits share a common table lookup unit. Taking a case that a standard symmetric cryptographic algorithm needs to use 8 S boxes each with 6-bit input and 4-bit output as an example, there are two algorithm subunits, a total length of input data of each algorithm subunit is 32 bits, and the application way includes:

(1) determining that S boxes are components in the symmetric cryptographic algorithm, and determining that there is one type of S boxes and the number of the S boxes is 8;

(2) determining that it is possible to reuse the S boxes since the number of the S boxes is greater than 1;

(3) determining to reuse the S boxes, and determining to use 2 S boxes, so that a maximum length of input data of the table lookup unit is 16 bits;

(4) dividing the input data of the table lookup unit into 2 data units each having 8 bits, determining that the first data unit corresponds to the first S box, and the second data unit corresponds to the second S box;

(5) if a total length of input data of each algorithm subunit is 32 bits, dividing the 32 bits into 2 input data segments, where a length of the first data segment is 16 bits, and a length of the second data segment is 16 bits, therefore the table lookup parameter is 2;

(6) using the generated table lookup unit by the two algorithm subunits in time sharing mode, in the way of, when one of the two algorithm subunits uses the table lookup unit, performing table lookup operation twice according to the table lookup parameter, and determining table lookup outputs according to a correspondence relationship between the data input and the S boxes which is determined in step (4); and (7) cascading the table lookup outputs to form a final output for the table lookup performed by the algorithm subunits through using the table lookup unit at the moment.

Third Embodiment

Figure 13:
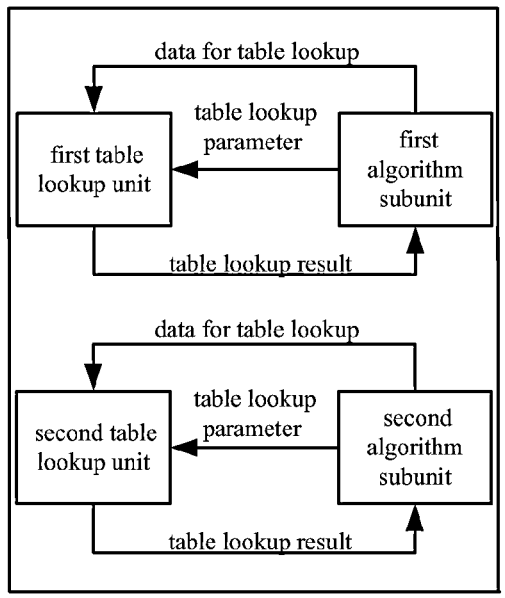
FIG. 13 is a schematic diagram of a way for using S boxes according to a third embodiment of the disclosure.

In this embodiment, as shown in FIG. 13, each of two or more algorithm subunits uses one table lookup unit independently. Taking a case that a standard symmetric cryptographic algorithm needs to use 8 S boxes each with 6-bit input and 4-bit output as an example, there are two algorithm subunits, a total length of input data of each algorithm subunit is 32 bits, the application way includes:

(1) determining that S boxes are components in the symmetric cryptographic algorithm, and determining that there is one type of S boxes and the number of the S boxes is 8;

(2) determining that it is possible to reuse the S boxes since the number of the S boxes is greater than 1;

(3) determining to reuse the S boxes;

(4) determining a table lookup unit used by a first algorithm subunit, of which specific steps include:

a. determining to use 2 S boxes, so that a maximum length of input data of the table lookup unit is 16 bits;

b. dividing the input data of the table lookup unit into 2 input data units each having 8 bits, and determining that the first data unit corresponds to the first S box, and the second data unit corresponds to the second S box;

c. if a total length of input data of the first algorithm subunit is 32 bits, dividing the 32 bits into 2 input data segments, where a length of the first data segment is 16 bits, and a length of the second data segment is 16 bits, therefore the table lookup parameter is 2; and (5) determining a table lookup unit used by a second algorithm subunit, of which specific steps include:

a. determining to use 1 S box, so that a maximum length of input data of the table lookup unit is 8 bits;

b. determining that the input data of the table lookup unit is a 8-bit input data unit;

c. if a total length of input information of the second algorithm subunit is 32 bits, dividing the 32 bits into 4 input data segments, where a length of the first data segment is 8 bits, a length of the second data segment is 8 bits, a length of the third data segment is 8 bits, and a length of the fourth data segment is 8 bits, therefore the table lookup parameter is 4;

(6) performing table lookup operation, probably concurrently, by the two algorithm subunits, where the first algorithm subunit performs table lookup twice according to the table lookup parameter while the second algorithm subunit performs table lookup for four times according to the table lookup parameter, and determining, by the two algorithm subunits, table lookup outputs respectively according to the correspondence relationships between data input and S boxes which are determined according to step (4) and step (5); and (7) cascading the table lookup outputs to form a final output of the table lookup performed by the respective algorithm subunits.

Fourth Embodiment

Figure 14:
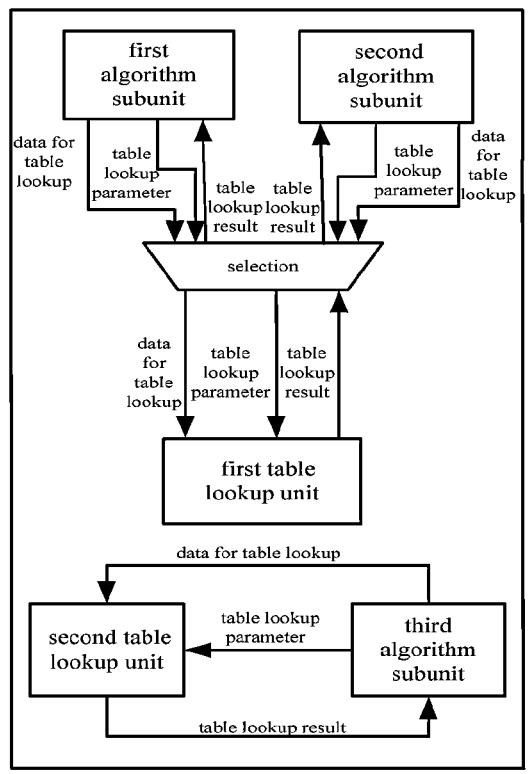
FIG. 14 is a schematic diagram of a way for using S boxes according to a fourth embodiment of the disclosure.

In this embodiment, as shown in FIG. 14, two or more algorithm subunits share a common algorithm subunit, and there is at least one algorithm subunit independently using one table lookup unit. Taking a case that a standard symmetric cryptographic algorithm needs to use 8 S boxes each with 6-bit input and 4-bit output as an example, there are three algorithm subunits, a total length of input data of each algorithm subunit is 32 bits, and the way includes:

(1) determining that S boxes are components in the symmetric cryptographic algorithm, and determining that there is one type of S boxes and the number of the S boxes is 8;

(2) determining that it is possible to reuse the S boxes since the number of the S boxes is greater than 1;

(3) determining to reuse the S boxes;

(4) determining a first table lookup unit shared by a first algorithm subunit and a second algorithm subunit, of which specific steps include:

a. determining to use 2 S boxes, so that a maximum length of input data of the table lookup unit is 16 bits;

b. dividing the input data of the table lookup unit into 2 input data units each having 8 bits, and determining that the first data unit corresponds to the first S box, and the second data unit corresponds to the second S box;

c. if a total length of input data of the first algorithm subunit and that of the second algorithm subunit is 32 bits, dividing 32 bits into 2 input data segments, where a length of the first data segment is 16 bits, and a length of the second data segment is 16 bits, therefore the table lookup parameter is 2;

(5) determining a second table lookup unit independently used by the third algorithm subunit, of which specific steps include:

a. determining to use 1 S box, so that a maximum length of input data of the table lookup unit is 8 bits;

b. determining that the input data of the table lookup unit is a 8-bit input data unit;

c. if a total length of input data of the third algorithm subunit is 32 bits, dividing 32 bits into 4 input data segments, where a length of the first data segment is 8 bits, a length of the second data segment is 8 bits, a length of the third data segment is 8 bits, and a length of the fourth data segment is 8 bits, therefore the table lookup parameter is 4;

(6) using the generated first table lookup unit by the first algorithm subunit and the second algorithm subunit in time sharing mode, in the way of, when one of the first algorithm subunit and the second algorithm uses the first table lookup unit, performing table lookup operation twice according to the table lookup parameter, and determining a table lookup output according to the correspondence relationship between the data input and the S boxes which is determined in step (4); and performing, by the third table lookup unit independently, table lookup for 4 times according to the table lookup parameter, and determining a table lookup output according to the correspondence relationship between data input and the S boxes which is determined in step (5); and (7) cascading the table lookup outputs to form a final output of the table lookup performed by respective algorithm subunits.

In a case that there are two or more types of S boxes in the symmetric cryptographic algorithm and there is only one algorithm subunit using the S boxes, there is one way for reusing the S boxes according to the embodiment of the disclosure, i.e., a way in which one algorithm subunit uses multiple table lookup units.

Fifth Embodiment

Figure 15:
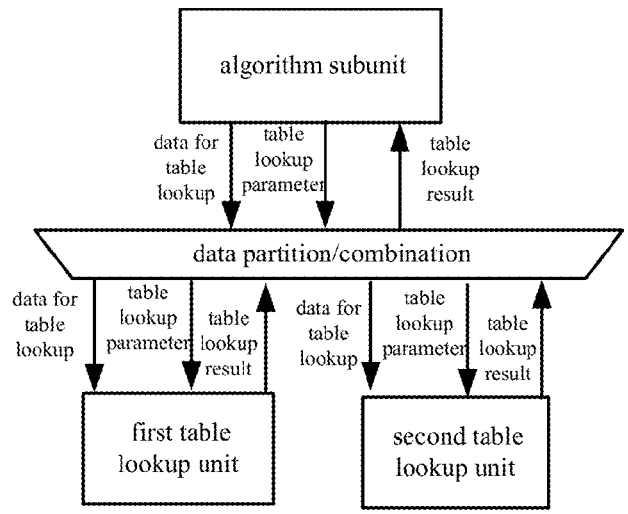
FIG. 15 is a schematic diagram of a way for using S boxes according to a fifth embodiment of the disclosure.

In this embodiment, as shown in FIG. 15, one algorithm subunit uses multiple table lookup units. Taking a case that a standard symmetric cryptographic algorithm needs to use 2 S0 boxes with 8-bit input and 8-bit output and 2 S1 boxes with 8-bit input and 8-bit output as an example, there is one algorithm subunit, a total length of input data of the algorithm subunit is assumed to be 32 bits, a total length of input data of the S0 boxes is 16 bits, a total length of input data of the S1 boxes is 16 bits, and the application way includes:

(1) determining that S boxes are components in the symmetric cryptographic algorithm, and determining that there are two types of S boxes, which are assumed to be S0 boxes and S1 boxes;

(2) determining that number of S0 boxes is 2, and number of S1 boxes is 2;

(3) determining a first table lookup unit, of which specific steps include:

a. determining that it is possible to reuse the S0 boxes since the number of the S0 boxes is greater than 1;

b. determining to reuse S0 box, and determining to use 1 S0 box, so that a maximum length of input data of the first table lookup unit is 8 bits;

c. determining that the input data of the table lookup unit is a 8-bit input data unit;

d. if a total length of data input to the table lookup unit from the algorithm subunit is 16 bits, dividing 16 bits into 2 input data segments, where a length of the first data segment is 8 bits, and a length of the second data segment is 8 bits, therefore the table lookup parameter is 2;

(4) determining a second table lookup unit, of which specific steps include:

a. determining that it is possible to reuse the S1 boxes since the number of the S1 boxes is greater than 1;

b. determining to reuse S1 box and determining to use 1 S1 box, so that a maximum length of input data of the second table lookup unit is 8 bits;

c. determining that the input data of the table lookup unit is a 8-bit input data unit;

d. if a total length of data input to the table lookup unit from the algorithm subunit is 16 bits, dividing 16 bits into 2 input data segments, where a length of the first data segment is 8 bits, and a length of the second data segment is 8 bits, therefore the table lookup parameter is 2;

(5) performing table lookup operation, probably concurrently, by the two table lookup units in a way of performing table lookup operation twice by each of the two table lookup units according to the table lookup parameter, and determining, by the two table lookup units, table lookup outputs respectively according to the correspondence relationships which are determined according to step (3) and step (4);

(6) cascading the table lookup outputs to form a final output of table lookup of the algorithm subunit.

In a case that there are two or more types of S boxes in the symmetric cryptographic algorithm and two or more algorithm subunits using the S boxes, according to the embodiment of the disclosure, there are three ways for reusing boxes, the first way is that the two or more algorithm subunits share two or more common table lookup units, the second way is that each of the two or more algorithm subunits uses at least one table lookup unit independently, the third way is that some of two and more algorithm subunits not only use at least one table lookup unit independently, but also share at least one common table lookup unit with some other algorithm subunits.

Sixth Embodiment

Figure 16:
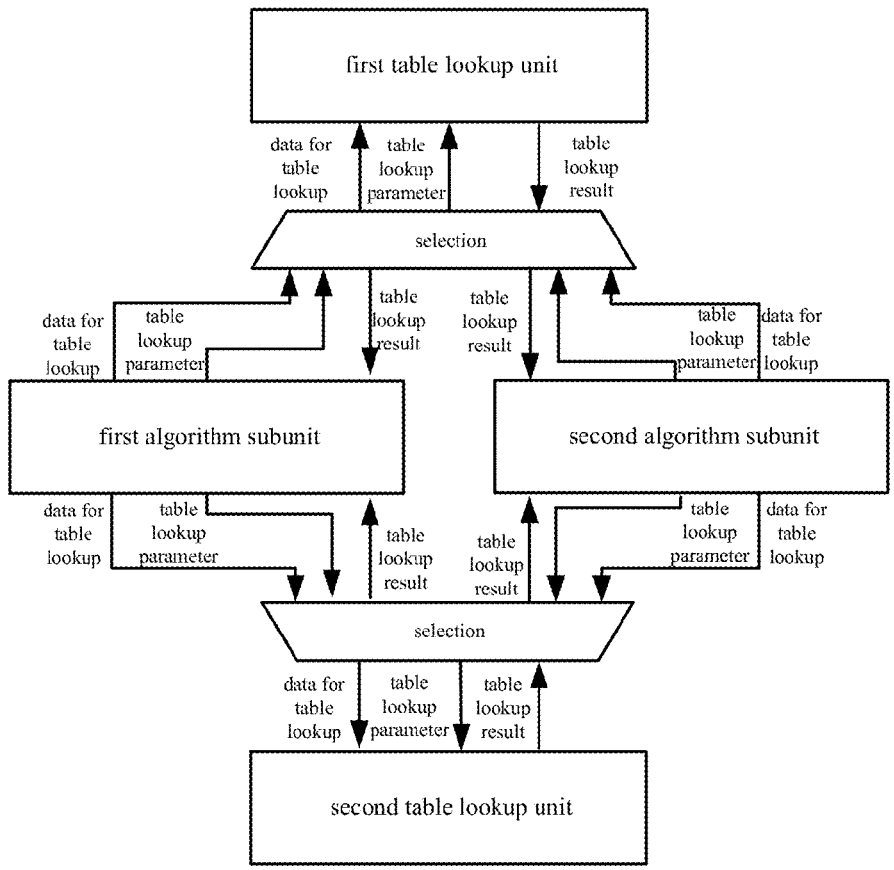
FIG. 16 is a schematic diagram of a way for using S boxes according to a sixth embodiment of the disclosure.

In this embodiment, as shown in FIG. 16, two or more algorithm subunits share two or more common table lookup units. Taking a case that a standard symmetric cryptographic algorithm needs to use 20 S0 boxes with 8-bit input and 8-bit output and 16 S1 boxes with 8-bit input and 8-bit output as an example, there are two algorithm subunits, a total length of data input to the S0 boxes from each algorithm subunit is 128 bits, a total length of data input to the S1 boxes from the algorithm subunit is 128 bits, and the application way includes:

(1) determining that S boxes are components in the symmetric cryptographic algorithm, and determining that there are two types of S boxes, which are assumed to be S0 boxes and S1 boxes;

(2) determining that number of S0 boxes is 20, and number of S1 boxes is 16;

(3) determining a first table lookup unit, of which specific steps include:

a. determining that it is possible to reuse the S0 boxes since the number of the S0 boxes is greater than 1;

b. determining to reuse S0 box, and determining to use 1 S0 box, so that a maximum length of input data of the first table lookup unit is 8 bits;

c. determining that the input data of the first table lookup unit is a 8-bit input data unit;

d. if a total length of data input to the S0 boxes from each algorithm subunit is 128 bits, dividing 128 bits into 16 input data segments, where a length of each data segment is 8 bits, therefore the table lookup parameter is 16;

(4) determining a second table lookup unit, of which specific steps include:

a. determining that it is possible to reuse the S1 boxes since the number of the S1 boxes is greater than 1;

b. determining to reuse S1 box and determining to use 1 S1 box, so that a maximum length of input data of the second table lookup unit is 8 bits;

c. determining that the input data of the table lookup unit is a 8-bit input data unit;

d. if a total length of data input to the S1 boxes from each algorithm subunit is 128 bits, dividing 128 bits into 16 input data segments, where a length of each data segment is 8 bits, therefore the table lookup parameter is 16;

(5) using the generated first table lookup unit and the generated second table lookup unit by the two algorithm subunits in time sharing mode, in the way of, when one of the algorithm subunits uses the first table lookup unit and the second table lookup unit, performing table lookup operation via the two table lookup units, probably concurrently, for 16 times respectively according to the table lookup parameter, and determining table lookup outputs according to correspondence relationships between the data input and the S boxes which are determined in step (3) and step (4); and (6) cascading the table lookup outputs to form a final output of the table lookup.

Seventh Embodiment

Figure 17:
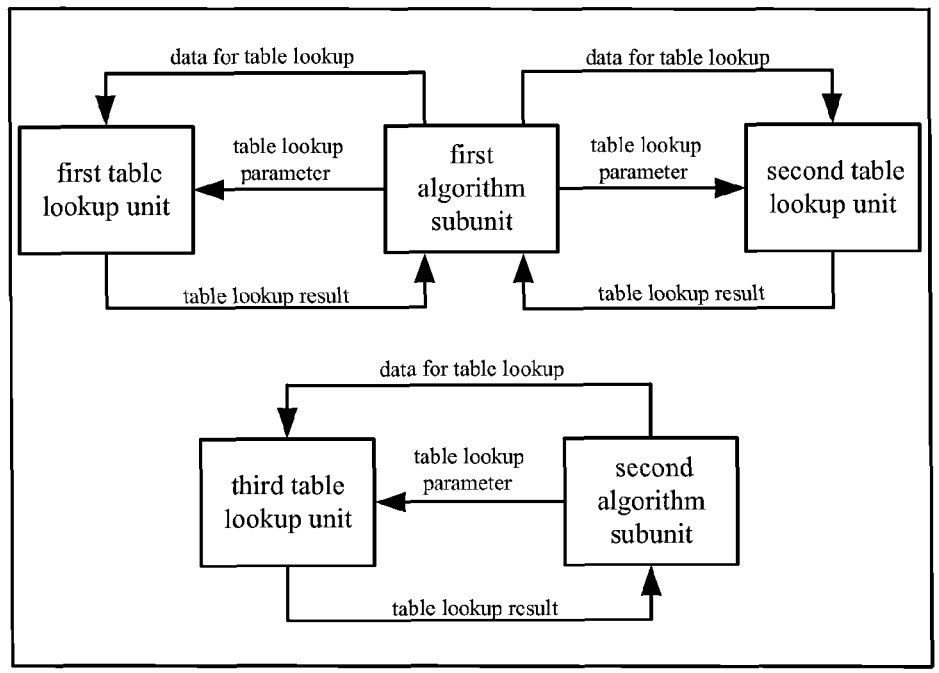
FIG. 17 is a schematic diagram of a way for using S boxes according to a seventh embodiment of the disclosure.

In this embodiment, as shown in FIG. 17, each of two or more algorithm subunits uses at least one table lookup unit independently. Taking a case that a standard symmetric cryptographic algorithm needs to use 20 S0 boxes with 8-bit input and 8-bit output and 16 S1 boxes with 8-bit input and 8-bit output as an example, there are two algorithm subunits, it is assumed that a total length of data input to the S0 boxes from each algorithm subunit is 128 bits, and a total length of data input to the S1 boxes from one of the two algorithm subunits is 128 bits, and the application way includes:

(1) determining that S boxes are components in the symmetric cryptographic algorithm, and determining that there are two types of S boxes, which are assumed to be S0 boxes and S1 boxes;

(2) determining that number of S0 boxes is 20, and number of S1 boxes is 16;

(3) determining a first table lookup unit used by a first algorithm subunit, of which specific steps include:

a. determining to use 2 S0 boxes, so that a maximum length of input data of the first table lookup unit is 16 bits;

b. dividing the input data of the first table lookup unit into 2 input data units each having 8 bits, and determining that the first data unit corresponds to the first S0 box, and the second data unit corresponds to the second S0 box;

c. if a total length of data input to the S0 boxes from the algorithm subunit is 128 bits, dividing 128 bits into 8 input data segments, where a length of each data segment is 16 bits, therefore the table lookup parameter is 8;

d. determining to use 2 S1 boxes, so that a maximum length of input data of a second table lookup unit is 16 bits;

e. dividing the input data of the second table lookup unit into 2 input data units each having 8 bits, and determining that the first data unit corresponds to the first S1 box, and the second data unit corresponds to the second S1 box;

f. if a total length of data input to the S1 boxes from the algorithm subunit is 128 bits, dividing 128 bits into 8 input data segments, where a length of each data segment is 16 bits, therefore the table lookup parameter is 8;

(4) determining a third table lookup unit used by a second algorithm subunit, of which specific steps include:

a. determining to use 1 S0 box, so that a maximum length of input data of the third table lookup unit is 8 bits;

b. determining that the input data of the third table lookup unit is a 8-bit input data unit;

c. if a total length of data input to the S0 box from the second algorithm subunit is 128 bits, dividing 128 bits into 16 input data segments, where a length of each data segment is 8 bits, therefore the table lookup parameter is 16;

(5) performing table lookup operation, probably concurrently, by the two algorithm subunits, where the first algorithm subunit performs table lookup via the first table lookup unit and the second table lookup unit, probably concurrently, for 8 times respectively according to the table lookup parameter, and the second algorithm subunit performs table lookup for 16 times according to the table lookup parameter through using the third table lookup unit; and determining, by the two algorithm subunits, table lookup outputs respectively according to the correspondence relationships between the data input and the S boxes which are determined in step (3) and step (4); and (6) cascading the table lookup outputs to form a final output of the table lookup performed by respective algorithm subunits.

Eighth Embodiment

Figure 18:
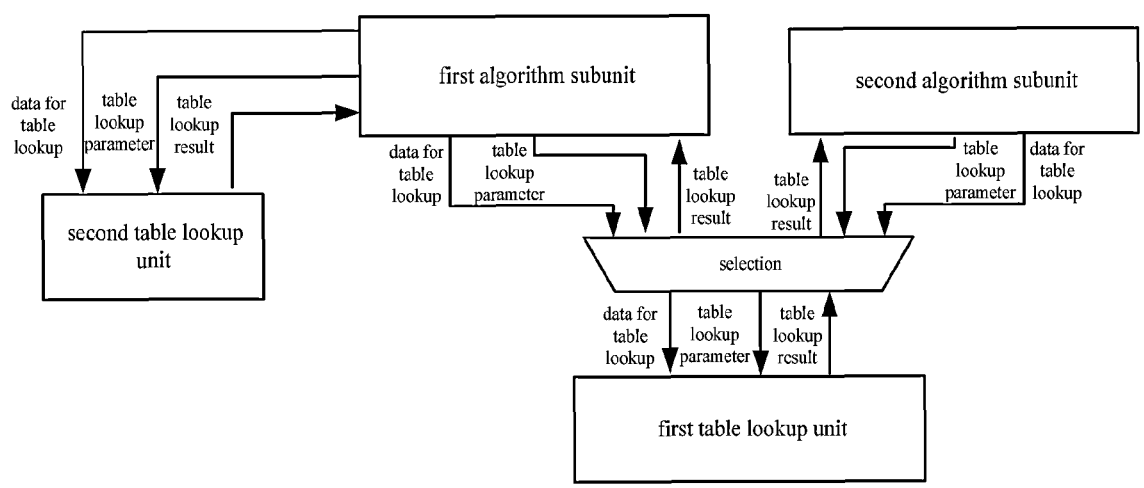
FIG. 18 is a schematic diagram of a way for using S boxes according to an eighth embodiment of the disclosure.

In this embodiment, as shown in FIG. 18, some of two or more algorithm subunits not only independently use at least one table lookup unit, but also share at least one common table lookup unit with some other algorithm subunits. Taking a case that a standard symmetric cryptographic algorithm needs to use 20 S0 boxes with 8-bit input and 8-bit output and 16 S1 boxes with 8-bit input and 8-bit output as an example, there are two algorithm subunits, total lengths of data input to the S0 boxes from the two algorithm subunits respectively are 128 bits and 32 bits, a total length of data input to the S1 boxes form one algorithm subunit is 128 bits, and the application way includes:

(1) determining at first that S boxes are components in the symmetric cryptographic algorithm, and determining that there are two types of S boxes, which are assumed to be S0 boxes and S1 boxes;

(2) determining that number of S0 boxes is 20, and number of S1 boxes is 16;

(3) determining a first table lookup unit shared by a first algorithm subunit and a second algorithm subunit, of which specific steps include:

a. determining that it is possible to reuse the S0 boxes since the number of the S0 boxes is greater than 1;

b. determining to reuse the S0 boxes, and determining to use 2 S0 boxes, so that a maximum length of input data of the first table lookup unit is 16 bits;

c. dividing the input data of the first table lookup unit into 2 input data units each having 8 bits, and determining that the first data unit corresponds to the first S0 box, and the second data unit corresponds to the second S0 box;

d. if a total length of data input to the S0 boxes from the first algorithm subunit is 128 bits, dividing 128 bits into 8 input data segments, where a length of each data segment is 16 bits, therefore the table lookup parameter is 8; and if a total length of data input to the S0 boxes from the second algorithm subunit is 32 bits, dividing 32 bits into 2 input data segments, where a length of each information segment is 16 bits, therefore the table lookup parameter is 2;

(4) determining a second table lookup unit independently used by the first algorithm subunit, of which specific steps include:

a. determining that it is possible to reuse the S1 boxes since the number of the S1 boxes is greater than 1;

b. determining to reuse S1 box and determining to use 1 S1 box, so that a maximum length of input data of the second table lookup unit is 8 bits;

c. determining that the input data of the second table lookup unit is a 8-bit input data unit;

d. if a total length of data input to the S1 boxes from the first algorithm subunit is 128 bits, dividing 128 bits into 16 input data segments, where a length of each data segment is 8 bits;

(5) using the first table lookup unit by the two algorithm subunits in time sharing mode, in a way of, when the first algorithm subunit uses the first table lookup unit, performing table lookup operation for 8 times according to the table lookup parameter, and when the second algorithm subunit uses the first table lookup unit, performing table lookup operation twice according to the table lookup parameter; using, by the first algorithm subunit, the second table lookup unit to perform table lookup operation for 16 times independently according to the table lookup operation; and determining, by the two algorithm subunits, table lookup outputs respectively according to the correspondence relationships between the data input and the S boxes which are determined in step (3) and step (4); and (6) cascading the table lookup outputs to form a final output of the table lookup.

Figure 19:
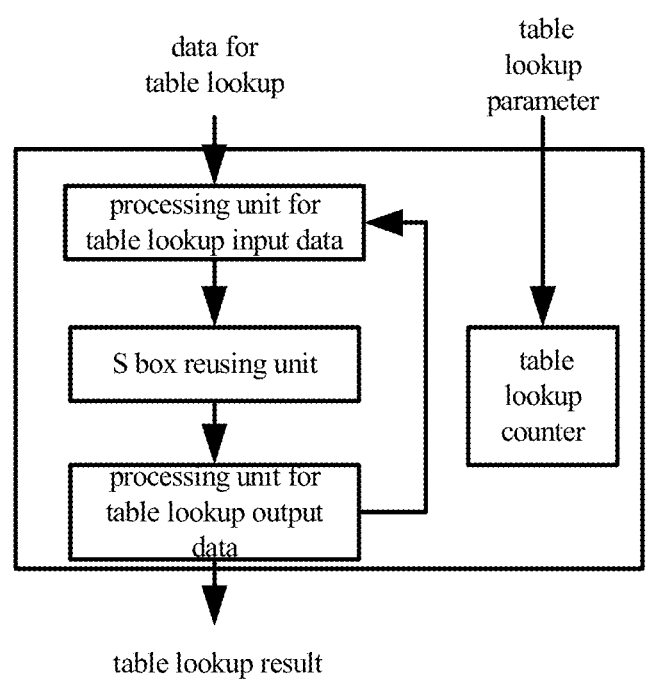
FIG. 19 is a structural diagram of a data encryption and decryption device using a symmetric cryptographic algorithm according to the disclosure.

As shown in FIG. 19, a table look-up device using a symmetric cryptographic algorithm to perform data encryption and decryption is also provided according to an embodiment of the disclosure. The device includes:

a processing unit for table lookup input data, configured to, in a case that table lookup is needed when encryption and decryption are performed by using the symmetric cryptographic algorithm, process input data for which table lookup needs to be performed, for feeding into a S box reusing unit;

the S box reusing unit, configured to reuse types of S boxes, which satisfy a reusing condition and are selected to be reused, and perform table lookup with the table lookup input data according to a predetermined correspondence relationship, and for each type of S boxes, in a case that total number $N_i$ of S boxes of this type is greater than 1, determine that the S boxes of this type satisfy the reusing condition; and a processing unit for table lookup output data, configured to process table lookup output information from the S box reusing unit to acquire a table lookup result.

Preferably, the processing unit for table lookup input data is further configured to divide input data corresponding to a table lookup unit used by an algorithm subunit into k data segments according to a total length l of the input data, feed the k data segments into the S box reusing unit in sequence, where k=⌈l/h⌉, ⌈ ⌉ represents rounding up, h is a maximum length of input data of the table lookup unit, which is determined according to the number of S boxes of the table lookup unit used by the algorithm subunit and a length of input data of each S box.

The S box reusing unit is further configured to execute table lookup operation for k times via the table lookup unit used by the algorithm subunit in a way of, for each time performing the table lookup operation, dividing an input data segment into data units according to a length of input data of the S boxes, feeding each data unit into corresponding S boxes according to a predetermined correspondence relationship to perform table lookup and determining output information of this execution of table lookup according to the predetermined relationship, and to output the output information for each execution of table lookup to the processing unit for table lookup output data.

The data encryption and decryption device using the symmetric cryptographic algorithm further includes: a table lookup counter configured to count at each completion of table lookup with one data segment and determine an end of the table lookup operation when counts to k.

The processing unit for table lookup output data is configured to buffer output information for each table lookup, and cascade the output information for respective table lookups at the end of the table lookup operation to acquire a table lookup result.

Preferably, for those types of S boxes, which are possibly not reused by the algorithm subunit, the processing unit for table lookup input data dose not segment table lookup input information of these S boxes, but directly feeds the table lookup information corresponding to these types of S boxes into the S box reusing unit, the S box reusing unit uses each of these type of S boxes used by the algorithm subunit as one independent table lookup unit, and feeds the input table lookup information into the corresponding table lookup unit to perform table lookup.

Figure 20:
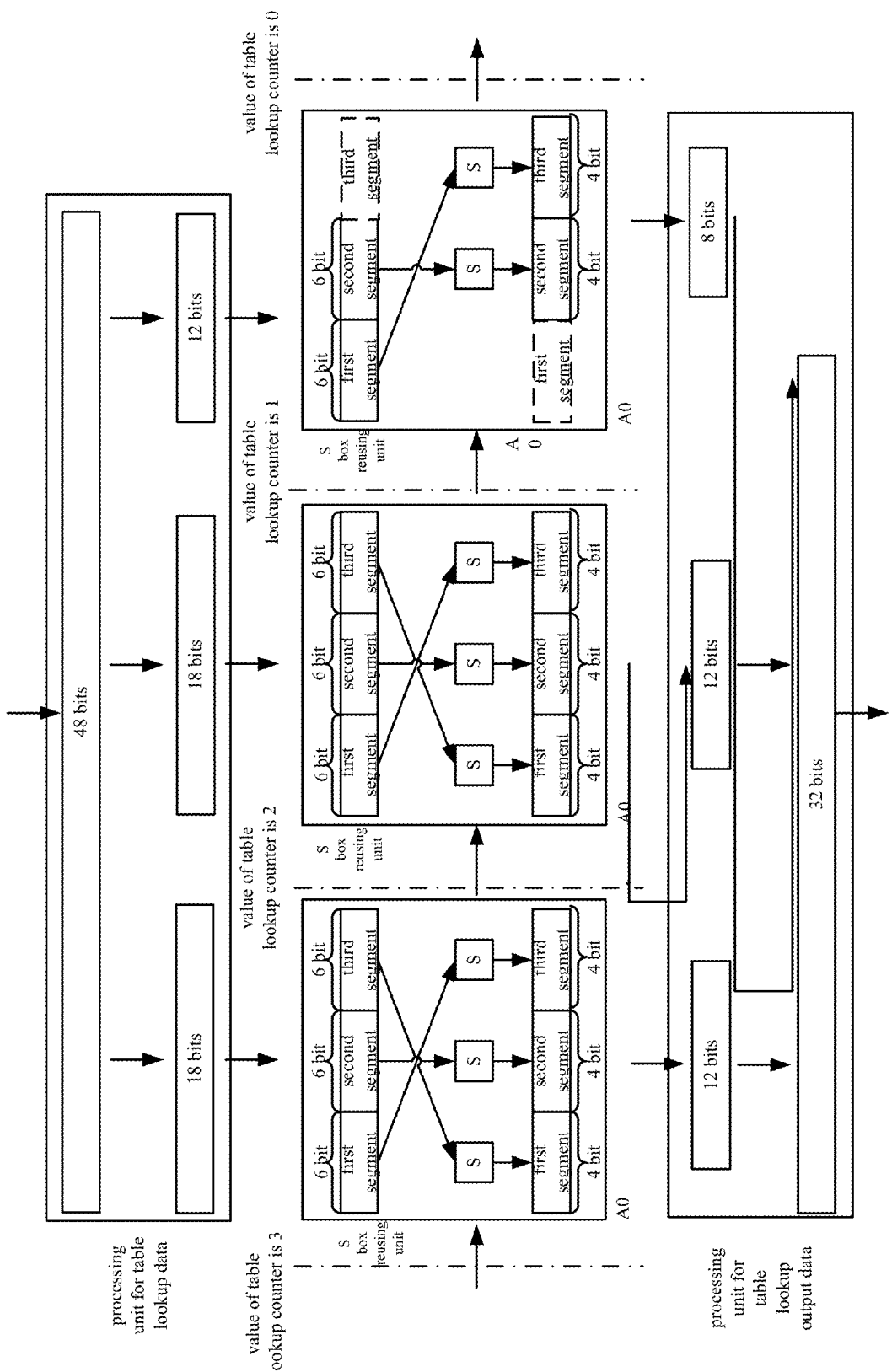
FIG. 20 shows an example of an operation way of a data encryption and decryption device using a symmetric cryptographic algorithm.

FIG. 20 shows an example of an operation way of a data encryption and decryption device using a symmetric cryptographic algorithm, in which a length of table lookup data is 48 bits, the table lookup parameter is 3 and a length of a table lookup result is 32 bits.

Apparently, some modifications and variants may be made by those skilled in the art within the scope and spirit of the disclosure. In this way, if the modifications and variants are within the scope of the claims of the disclosure and equivalent thereof, the disclosure also intends to include the modifications and variants.

The invention claimed is:

1. A data encryption and decryption method using a symmetric cryptographic algorithm to reduce hardware resource occupied for implementing the symmetric cryptographic algorithm, comprising:

once S boxes are needed to be used to perform table lookup in the symmetric cryptographic algorithm, determining types of all S boxes needed to be used;

for each type of S boxes, determining $N_i$, wherein $N_i$ indicates a total number of S boxes of the type, and in a case that $N_i$ is greater than 1, determining that a reusing condition is satisfied for the type of S boxes; and reusing at least one type of S boxes, for which the reusing condition is satisfied, in the data encryption and decryption using the symmetric cryptographic algorithm;

wherein at least one S box of one type that satisfies the reusing condition is used as one table lookup unit, each table lookup unit corresponds to one hardware module in hardware implementation;

for any algorithm subunit, once S boxes used by the algorithm subunit are reused selectively, the table lookup unit corresponding to the algorithm subunit is determined according to reuse situation, and the algorithm subunit uses the corresponding table lookup unit to perform table lookup, comprising:

determining a maximum length h of input data of the table lookup unit according to the number of S boxes for the table lookup unit and a length of input data of each S box;

dividing the input data for table lookup performed by the algorithm subunit through using the table lookup unit into k data segments according to a total length l of the input data, wherein k=⌈l/h⌉, and ⌈ ⌉ represents rounding up;

executing table lookup operation for k times in a way of, for each time performing the table lookup operation, dividing an input data segment into data units based on the length of input data of the S box, feeding each data unit into the corresponding S box according to a predetermined correspondence relationship to perform the table lookup, and determining output information of the table lookup operation according to the predetermined relationship; and cascading the output information from the k executions of the table lookup to acquire a table lookup result.

2. The method according to claim 1, wherein once a type of S boxes of said at least one type of S boxes satisfies the reusing condition, a reusing way in the following is used:

determining algorithm subunits using the type of S boxes;

in a case that there is only one algorithm subunit using the type of S boxes, determining that after reuse, the number of S boxes of this type is u wherein $1 \leq u < N_j$; and using u S boxes of this type as one table lookup unit, wherein the algorithm subunit uses the table lookup unit to perform table lookup.

3. The method according to claim 1, wherein once a type of S boxes of said at least one type of S boxes satisfies the reusing condition, a reusing way in the following is used:

determining algorithm subunits using the type of S boxes;

in a case that there are at least two algorithm subunits using the type of S boxes, for at least two among the algorithm subunits using the type of S boxes, determining that after reuse, the number of S boxes of the type used by the at least two algorithm subunits is u, wherein $1 \leq u \leq N_{max}$, wherein $N_{max}$ represents the maximum number of S boxes of the type used by one of the at least two algorithm subunits which uses most S boxes before reuse; and using u S boxes of the type as one table lookup unit, and performing table lookup through using the table lookup unit in time sharing mode by the at least two of the algorithm subunits using the type of S boxes.

4. The method according to claim 1, wherein once a type of S boxes of said at least one type of S boxes satisfies the reusing condition, a reusing way in the following is used:

determining algorithm subunits using the type of S boxes;

in a case that there are at least two algorithm subunits using the type of S boxes, for each one of at least one algorithm subunit among the algorithm subunits using the type of S boxes, determining $u_i$, wherein $u_i$ indicates that after reuse, the number of S boxes of the type used by the algorithm subunit, $1 \leq u_i < N_j$, and wherein $N_j$ represents the number of S boxes of the type used by the algorithm subunit before reuse; using $u_i$ S boxes of the type as one table lookup unit, and performing table lookup using the table lookup unit independently by the algorithm subunit.

5. The method according to claim 1, wherein once a type of S boxes of said at least one type of S boxes satisfies the reusing condition, a reusing way in the following is used:

determining algorithm subunits using the type of S boxes;

in a case that there are at least three algorithm subunits using the type of S boxes, for each one of at least one algorithm subunit among the algorithm subunits using the type of S boxes, determining $u_i$, wherein $u_i$ indicates that after reuse, the number of S boxes of the type used by the algorithm subunit and $1 \leq u_i < N_j$, wherein $N_j$ indicates the number of S boxes of the type used by the algorithm subunit before reuse; using $u_i$ S boxes of the type as one table lookup unit, and performing table lookup using the table lookup unit independently by the algorithm subunit; and for at least two among the at least three algorithm subunits using the type of S boxes, determining $u_{com}$, wherein $u_{com}$ indicates that after reuse, the number of S boxes of the type used by the at least two algorithm subunits, wherein $1 \leq u_{com} \leq N_{max}$, wherein $N_{max}$ represents the maximum number of S boxes of the type used by one of the at least two algorithm subunits which uses most S boxes before reuse; using $u_{com}$ S boxes of the type as one table lookup unit, and performing table lookup through using the table lookup unit in time sharing mode by the at least two of the algorithm subunits using the type of S boxes.

6. The method according to claim 1, wherein the symmetric cryptographic algorithm is AES algorithm, block cipher SM4 algorithm or ZUC stream cipher algorithm.

7. The method according to claim 2, wherein the algorithm subunit is an encryption unit, a decryption unit or a key expansion unit.

8. A table look-up device for data encryption and decryption using a symmetric cryptographic algorithm to reduce hardware resource occupied for implementing the symmetric cryptographic algorithm, comprising:

a processing unit for table lookup input data, configured to, in a case that table lookup is needed in the encryption and decryption using the symmetric cryptographic algorithm, process input data for which the table lookup needs to be performed, for feeding into a S box reusing unit;

the S box reusing unit, configured to reuse types of S boxes, which satisfy a reusing condition and are selected to be reused, perform table lookup with the table lookup input data according to a predetermined correspondence relationship, and for each type of S boxes, in a case that a total number $N_i$ of S boxes of this type is greater than 1, determine that the S boxes of this type satisfy the reusing condition; and a processing unit for table lookup output data, configured to process table lookup output information from the S box reusing unit to acquire a table lookup result;

wherein at least one S box of one type that satisfies the reusing condition is used as one table lookup unit, each table lookup unit corresponds to one hardware module in hardware implementation;

the processing unit for table lookup input data is further configured to divide input data corresponding to a table lookup unit used by an algorithm subunit into k data segments according to a total length l of the input data, feed the k data segments into the S box reusing unit in sequence, wherein k=⌈l/h⌉, ⌈ ⌉ represents rounding up, and h is a maximum length of input data of the table lookup unit, which is determined according to the number of S boxes of the table lookup unit used by the algorithm subunit and a length of input data of each S box;

the S box reusing unit is further configured to execute table lookup for k times via the table lookup unit used by the algorithm subunit in a way of, for each time performing the table lookup, dividing an input data segment into data units based on the length of input data of the S boxes, feeding each data unit into corresponding S boxes according to a predetermined correspondence relationship to perform table lookup and determining output information of this execution of table lookup according to the predetermined relationship; and to output the output information for each execution of table lookup to the processing unit for table lookup output data;

the table look-up device for data encryption and decryption using the symmetric cryptographic algorithm further comprises: a table lookup counter configured to at each completion of table lookup with one data segment and determine an end of the table lookup operation when counts to k; and the processing unit for table lookup output data is further configured to buffer output information for each execution of table lookup, and cascade the output information for respective table lookups at the end of the table lookup operation to acquire a table lookup result.

9. The method according to claim 3, wherein each table lookup unit corresponds to only one hardware module in hardware implementation.

10. The method according to claim 4, wherein each table lookup unit corresponds to only one hardware module in hardware implementation.

11. The method according to claim 5, wherein each table lookup unit corresponds to only one hardware module in hardware implementation.

12. The method according to claim 3, wherein the algorithm subunit is an encryption unit, a decryption unit or a key expansion unit.

13. The method according to claim 4, wherein the algorithm subunit is an encryption unit, a decryption unit or a key expansion unit.

\* \* \* \* \*